US006178299B1

United States Patent
Kim (10) Patent No.: US 6,178,299 B1
(45) Date of Patent: Jan. 23, 2001

(54) METHOD OF CONTROLLING POWER SUPPLY TO HEAT SOURCE OF PRINTER AND APPARATUS THEREFOR

(75) Inventor: Yong-geun Kim, Suwon (KR)

(73) Assignee: Samsung Electronics Co., Ltd., Kyungki-Do (KR)

( * ) Notice: Under 35 U.S.C. 154(b), the term of this patent shall be extended for 0 days.

(21) Appl. No.: 09/369,852

(22) Filed: Aug. 9, 1999

(30) Foreign Application Priority Data

Aug. 7, 1998 (KR) .................................................. 98-32132

(51) Int. Cl.[7] .................................................. G03G 15/00
(52) U.S. Cl. ............................ 399/88; 219/216; 219/490; 399/37; 399/43; 399/251
(58) Field of Search .................................. 399/37, 88, 69, 399/70, 43, 251, 307, 33; 219/216, 490, 492, 494; 430/117, 124, 126

(56) References Cited

U.S. PATENT DOCUMENTS

| 4,801,968 | * | 1/1989 | Kogure et al. ...................... 399/88 X |
| 5,671,462 | * | 9/1997 | Toyohara et al. ....................... 399/33 |
| 5,682,576 | * | 10/1997 | Sakai et al. ............................. 399/69 |
| 5,862,436 | * | 1/1999 | Ishizawa et al. ....................... 399/69 |
| 5,978,618 | * | 11/1999 | Yamamoto et al. .................... 399/69 |
| 5,995,397 | * | 11/1999 | Kim ................................. 399/88 X |

FOREIGN PATENT DOCUMENTS 6-95541    4/1994  (JP) .

* cited by examiner

Primary Examiner—Sophia S. Chen
(74) Attorney, Agent, or Firm—Sughrue, Mion, Zinn, Macpeak & Seas, PLLC (57) ABSTRACT

A method of controlling a power supply to heat sources of a printer and an apparatus for controlling power supply to heat sources of a printer include: a heat generating portion having a plurality of heat sources; a power supply unit; a switching portion having a plurality of switches installed so as to connect or disconnect the power supply from the power supply unit to the individual heat sources; thermal sensors for sensing the temperatures of heat-supplied objects corresponding to the heat sources and generating corresponding temperature signals; and a power supply controller for adjusting the on times of the heat sources so that all periods of power supply to the heat sources do not overlap. Output signals from the thermal sensors for the respective heat sources are used to control the switching portion so that the temperatures of the heat-supplied objects are maintained within the respective preset temperature ranges. A method of controlling the power supply to heat sources of a printer and the apparatus therefor allows the maximum consumed power of employed heaters to be reduced. Therefore, the required power capacity of the power supply unit and the allowable amount of current of the power supply lines can be lowered.

11 Claims, 5 Drawing Sheets

METHOD OF CONTROLLING POWER SUPPLY TO HEAT SOURCE OF PRINTER AND APPARATUS THEREFOR

BACKGROUND OF THE INVENTION

1. Field of the Invention

The present invention relates to a method of controlling a power supply to heat sources of a printer and an apparatus therefor, and more particularly, to a method of controlling the power supply to heat sources of a printer in which the power supply is controlled so that the individual heat sources maintain their desired operating temperatures while periods of power supply to the individual heat sources do not overlap all at once.

2. Description of the Related Art

Figure 1:
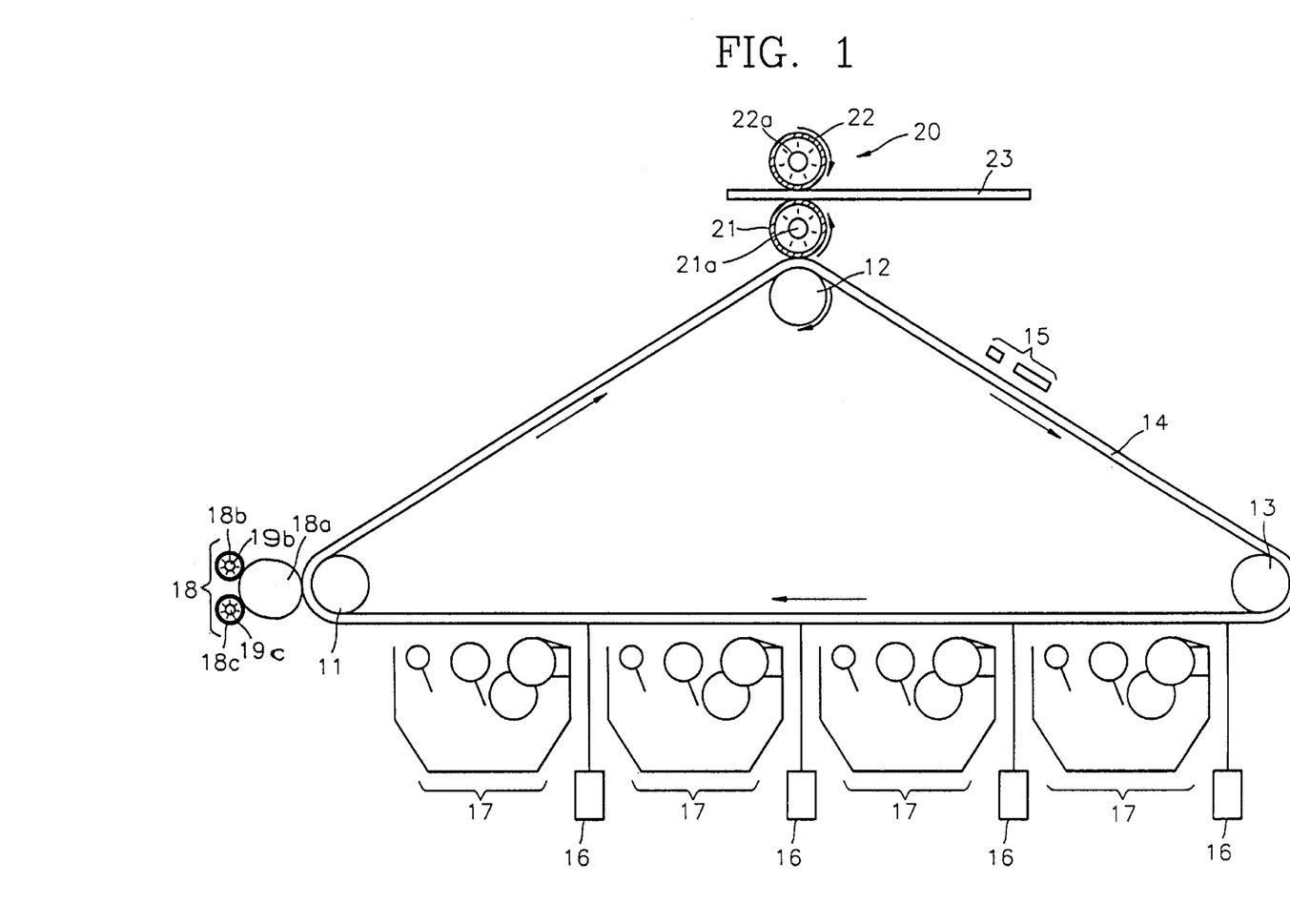
FIG. 1 is a schematic diagram illustrating a general liquid electrophotographic printer.

FIG. 1 is a schematic diagram illustrating a general liquid electrophotographic printer.

Referring to FIG. 1, in a liquid electrophotographic printer, a reset device 15, light scanning devices 16, developing devices 17, a drying unit 18, and a transfer unit 20 are disposed along the circulation path of a photosensitive belt 14 circulated by a plurality of rollers 11, 12 and 13.

In a printing operation, first, the light scanning device 16 scans a light beam along the photosensitive belt 14 circulating past the reset device 15. An electrostatic latent image is formed on the photosensitive belt 14 by the scanning of light. The electrostatic latent image is developed with a developer supplied from the developing device 17. The color image formed on the photosensitive belt 14 is first transferred to a transfer roller 21 as the photosensitive belt 14 continues to advance. Then, the image on the transfer roller 21 is then transferred to a paper 23 when the transfer roller 21 and a fixing roller 22 rotate in contact with each other while causing the paper 23 interposed therebetween to advance.

In the above printer structured so as to perform the above printing operation, there are prerequisite conditions for normal printing operations. In the case of the transfer unit 20, primarily, the surfaces of transfer roller 21 and the fixing roller 22, must be maintained at appropriate preset temperatures. In addition, two heating rollers 18b and 18c must be maintained at a given temperature, since the two heating rollers 18b and 18c periodically evaporate the liquid carrier absorbed in a drying roller 18a while rotating in contact with the drying roller 18a. Here, the drying roller 18a absorbs the liquid carrier remaining on the photosensitive belt 14 while leaving the image forming toner of the liquid developer, supplied from the developing device 17, on the photosensitive belt 14 for developing an electrostatic latent image.

Figure 2:
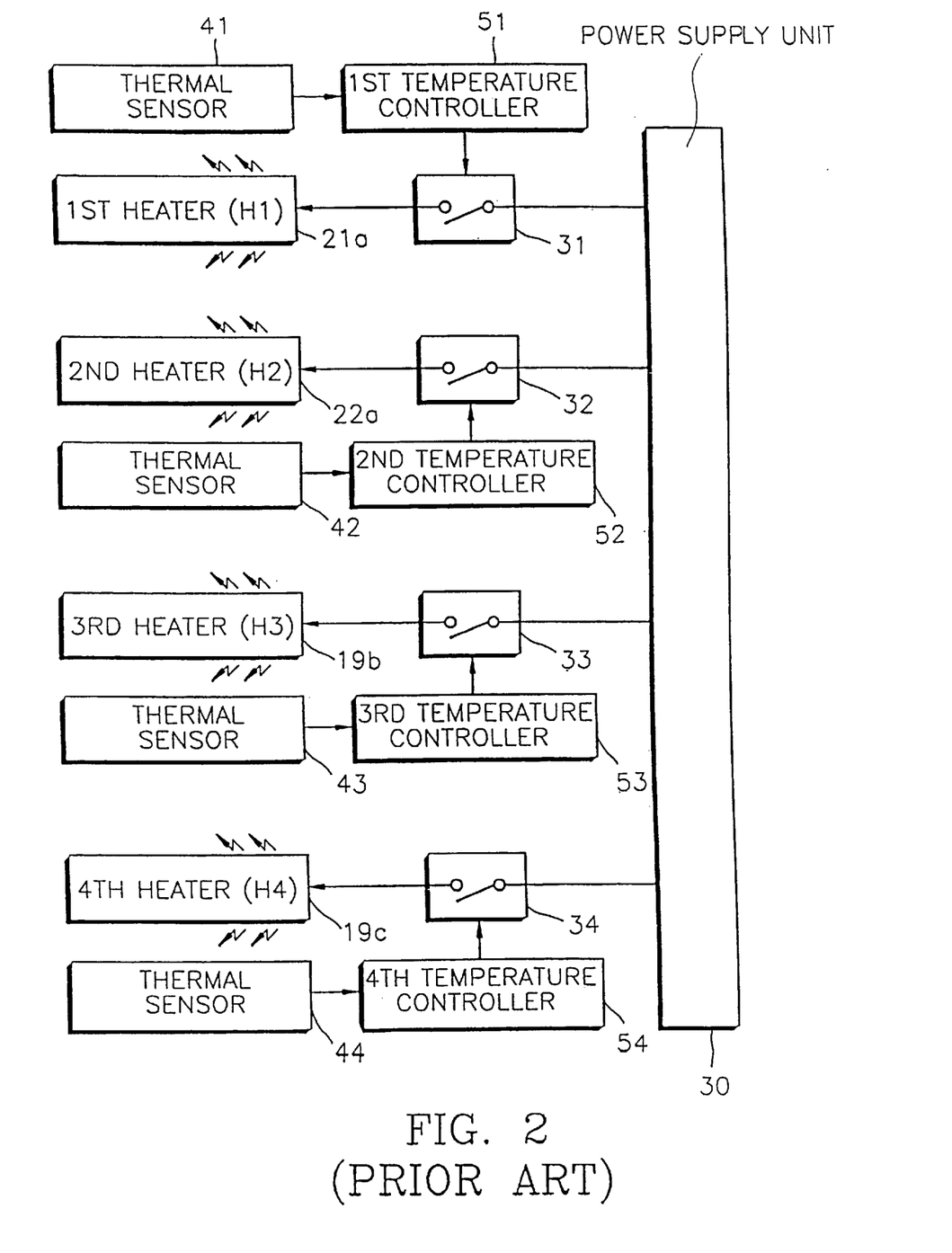
FIG. 2 is a block diagram illustrating conventional power supply controlling circuits of the heat sources of FIG. 1.

FIG. 2 shows conventional controlling circuits for controlling the power supply to heaters 19b, 19c, 21a and 22a installed in the rollers 18b, 18c, 21 and 22, so that respective heating temperatures required for performing such a printing operation are maintained.

In FIG. 2, the first heater 21a is intended to heat the transfer roller 21, the second heater 22a is intended to heat the fixing roller 22, and the third and fourth heaters 19b and 19c are intended to heat the drying unit 18.

The controlling circuits for controlling the power supply to the individual heaters 19b, 19c, 21a and 22a comprise: switch devices 31, 32, 33 and 34, capable of connecting or disconnecting power from a power supply unit 30 to the respective heaters 19b, 19c, 21a and 22a; thermal sensors 41, 42, 43 and 44 for generating information concerning the temperatures of the respective heat-supplied objects corresponding to the heaters 19b, 19c, 21a and 22a; and, temperature controllers 51, 52, 53 and 54 for controlling the on/off operations of the switch devices 31, 32, 33 and 34 according to the information supplied by the thermal sensors 41, 42, 43 and 44. Such power supply controlling circuits are provided for the respective heaters 19b, 19c, 21a and 22a, independently. Therefore, there may be a time or a period when all the switch devices 31, 32, 33 and 34 are turned on while the temperature controllers 51, 52, 53 and 54 individually control the on/off operations of the switch devices 31, 32, 33 and 34 so as to maintain the set temperatures of the respective heat-supplied objects. When all the switch devices 31, 32, 33 and 34 are turned on, the instantaneous power to be supplied by the power supply unit 30 increases. Consequently, such conventional power supply controlling circuits must be provided with a power supply unit 30 which has a power capacity much larger than that the mean power required for continuous operation. Power supply lines must be compatible with the maximum instantaneous current so as to supply the instantaneous maximum power when all the switch devices 31, 32, 33 and 34 are turned on, and such conventional circuits must satisfy a higher equipment requirement.

SUMMARY OF THE INVENTION

To solve the above problems, it is an objective of the present invention to provide a method of controlling the power supply to heat sources of a printer and an apparatus therefor which can perform temperature control for maintaining the desired temperatures of the heat-supplied objects while reducing instantaneous maximum power consumption.

Accordingly, to achieve the above objective, there is provided a method of controlling the power supply to heat sources of a printer, which comprises a heat generating portion having a plurality of heat sources, a power supply unit, and a power supply controller for controlling the power from the power supply unit to the heat generating portion, including the steps of: a) grouping predetermined heat sources into a first group, and grouping all or part of the remaining heat sources not belonging to the first group, among the heaters composing the heat generating portion, into a second group for adjusting periods of power supply to the heaters belonging to the heat generating portion; b) controlling the power supply to the heat sources belonging to the first group for controlling temperatures of the heat sources belonging to the first group while disconnecting the power supply to the heat sources belonging to the second group for a predetermined first time; c) disconnecting the power supply to the heat sources belonging to the first group for a predetermined second time after the first time has passed, and controlling the power supply to the heat sources belonging to the second group for controlling temperatures of the heat sources belonging to the second group; and d) repeating step b) and step c) at least once.

It is preferable that the heat generating portion comprises a first heat source for heating a transfer roller that transfers a toner image formed on a photosensitive medium to a paper, a second heat source for heating a fixing roller that rotates while pressing against the transfer roller so that the toner image transferred to the transfer roller can be securely fixed to the paper, and third and fourth heat sources installed in a drying unit for absorbing and evaporating liquid carrier remaining on the photosensitive medium. The second heat source, which requires the largest power among the four heat sources during printing, is grouped into the first group, and the first, third, and fourth heat sources are grouped into the second group.

According to one aspect of the present invention, there is provided a method of controlling the power supply to heat sources of a printer. The printer comprises: a heat generating portion having a first heat source for heating a transfer roller, which transfers a toner image formed on a photosensitive medium to a paper; a second heat source for heating a fixing roller, which rotates while pressing against the transfer roller so that the toner image transferred to the transfer roller can be securely fixed; third and fourth heat sources installed in a drying unit for absorbing and evaporating liquid carrier remaining on the photosensitive medium; a power supply unit; and, a power supply controller for controlling the power supply from the power supply unit to the heat generating portion. The method comprises the steps of: a) supplying power to the second heat source until the surface temperature of the fixing roller reaches a preset upper limit temperature; b) disconnecting the power supply to the second heat source when the surface temperature of the fixing roller reaches the upper limit temperature, and individually controlling the power supply to the first, third, and fourth heat sources until the surface temperature of the fixing roller falls to a lower limit temperature set below the upper limit temperature, so that the heat-supplied objects corresponding to the first, third, and fourth heat sources can maintain preset target temperatures; and, c) repeating step a) and step b) at least once.

Here, while step a) is performed, the power supply to any one heat source, selected from the first, third, and fourth heat sources, is controlled together with the second heat source for controlling the temperature thereof.

In addition, to achieve the above objective, there is provided an apparatus for controlling a power supply to heat sources of a printer comprising: a heat generating portion having a plurality of heat sources; a power supply unit; a switching portion having a plurality of switches installed so as to connect or disconnect the power supply of the power supply unit to the individual heat sources; thermal sensors for sensing the temperatures of heat-supplied objects corresponding to the heat sources and generating corresponding temperature signals; and, a power supply controller for adjusting the on times of the heat sources so that all periods of power supply to the heat sources do not overlap, the controller reading the output signals from the thermal sensors paired with the respective heat sources, and controlling the switching portion so that the temperatures of the heat-supplied objects are maintained within the respective preset temperature ranges.

It is preferable that the power supply controller comprises: temperature controllers which output first signals requesting disconnection of the power supply to the heat sources, via output channels provided corresponding to the heat sources, when the surface temperatures of the heat-supplied objects reach respective preset upper limit temperatures depending on signals output from the thermal sensors paired with the respective heat sources, and which output second signals requesting connection of the power supply to the heat sources via the output channels when the surface temperatures of the heat-supplied objects reach respective preset lower limit temperatures depending on signals output from the thermal sensors; and, a signal adjusting portion for receiving signals output via the output channels of the temperature controllers, and, when all the received signals are the second signals, converting some of the second signals into the first signals according to an internally determined signal conversion method, and outputting the signals to the switching portion.

BRIEF DESCRIPTION OF THE DRAWINGS

The above objectives and advantages of the present invention will become more apparent by describing in detail preferred embodiments thereof with reference to the attached drawings, in which.

DESCRIPTION OF THE PREFERRED EMBODIMENTS

In general, printers differ in the number of heat sources forming heat generating portions, and in heat-supplied objects thereof, depending on the type of printer. For example, in the case of an electrophotographic printer using only solid toner as a developer, heat generating portions may consist of heaters for heating a transfer roller and a fixing roller. A method of controlling the power supply to heat sources of a printer, and an apparatus therefor according to the present invention, can be applied to printers employing at least two heat sources, and the more heat sources there are, the more varieties of methods exist for adjusting the power supply to the heat sources within the preset range of possible power supply in accordance with temperature controlling of the heat sources. Taking this into consideration, a power supply controlling apparatus according to the present invention, as applied to the liquid electrophotographic printer of FIG. 1 employing four heaters as heat sources will be described as an example.

Figure 3:
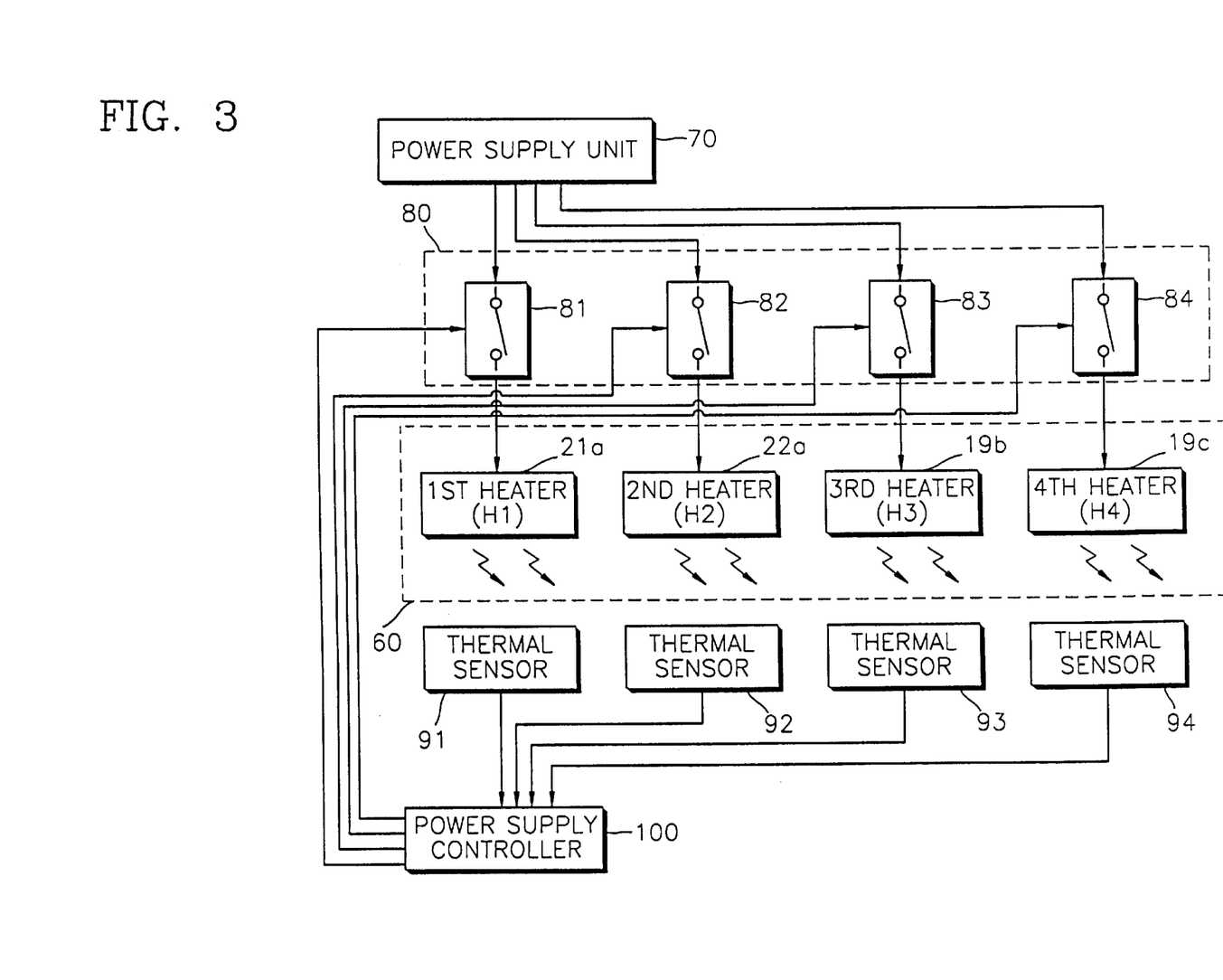
FIG. 3 is a block diagram illustrating a power supply controlling apparatus of a printer according to the present invention.

FIG. 3 shows a power supply controlling apparatus of a printer according to the present invention. Reference numerals of heaters and heat-supplied objects are the same as those of FIG. 1.

Referring to FIG. 3, a power supply controlling apparatus comprises a heat generating portion 60, a power supply unit 70, a switching portion 80, thermal sensors 91, 92, 93 and 94, and a power supply controller 100.

The heat generating portion 60 has four heaters 19b, 19c, 21a and 22a. The first heater 21a is for heating a transfer roller 21, the second heater 22a is for heating a fixing roller, and the third and fourth heaters 19b and 19c are for heating a drying unit 18.

The power supply unit 70 is supplied with power from an external power source (not shown), such as an AC power source, and develops multiple voltages as required for the various devices of the printer.

The switching portion 80 comprises four switches 81, 82, 83 and 84 which are installed on power lines to the individual heaters 21a, 22a, 19b and 19c, respectively, from the power supply unit 70, and which independently perform switching ON and OFF of the power supply to the respective heaters.

The thermal sensors 91, 92, 93 and 94 sense the temperatures of respective heat-supplied objects corresponding to the heaters 21a, 22a, 19b and 19c, and output signals corresponding to the sensed temperatures. That is, the thermal sensor 91 paired with the first heater 21a senses the surface temperature of the transfer roller 21, the thermal sensor 92 paired with the second heater 22a senses the surface temperature of the fixing roller 22, and the thermal sensors 93 and 94 paired with the third and fourth heaters 19b and 19c, respectively, sense the surface temperatures of the heating rollers 18b and 18c of the drying unit 18. The thermal sensors 91, 92, 93 and 94 each have internal circuits which are configured so that the thermal sensors 91, 92, 93 and 94 receive temperature information of temperature-sensed objects by using thermistors, which change their resistance values according to varying temperatures.

The power supply controller 100 controls the ON/OFF operations of the switches 81, 82, 83 and 84 according to the respective output signals of the thermal sensors 91, 92, 93 and 94 so that the individual heat-supplied objects can be maintained at the respective preset target temperatures. Generally, the target temperatures vary with the operational modes of the printer. For example, the target heating temperatures of individual heat-supplied objects in a power saving mode are set to be lower than those in a print ready mode in which the printer is ready for printing. Here, the print ready mode is changed into the power saving mode when a print job is not performed for a predetermined time in the print ready mode.

The power supply controller 100, which thus appropriately controls the power supply to the individual heater 21a, 22a, 19b and 19c depending on the operational modes of the printer, controls the individual temperatures of the heat-supplied objects while adjusting the times that power is supplied to the respective heaters 21a, 22a, 19b and 19c so that ON periods of the switches 81, 82, 83 and 84 do not overlap all at once.

In a method of adjusting the times that power is supplied to the respective heaters 21a, 22a, 19b and 19c so that the ON periods of the switches 81, 82, 83 and 84 do not overlap all at once, some predetermined heat sources of the heat generating portion 60 are grouped into a first group, and all or a part of the remaining heat sources are grouped into a second group. With respect to the individual groups so divided, the power supply controller 100 first controls the power supply to the heat sources belonging to the first group for a predetermined first time period, so as to control the temperatures of the heat sources belonging to the first group while disconnecting the power supply to the heat sources belonging to the second group, so that the periods of power supply to heat sources do not overlap each other.

Next, after the first time has passed, the power supply controller 100 controls the power supply to the heat sources belonging to the second group for a predetermined second time period, so as to control the temperatures of the heat sources belonging to the second group while disconnecting the power supply to the heat sources belonging to the first group.

After the second time has passed, the power supply controller 100 again controls the power supply to the heat sources belonging to the first group for the predetermined first time period. Such a procedure is repeated in a cycle consisting of the first and second times. Therefore, the maximum instantaneous value of required power is limited to the total power supplied to all the heat sources belonging to either group. In order to facilitate the temperature control, it is preferable to set the first and second times to be as short as possible, for example, between several seconds and several milliseconds. In addition, the power supply controller 100 controls the switching portion 80 so that the power supply to the controlled heat sources belonging to the first group is respectively connected and/or disconnected to perform the temperature control for the predetermined first time period when the power supply to the second group is disconnected. Similarly, the power supply controller 100 controls the switching portion 80 so that the power supply to the controlled heat sources belonging to the second group is respectively connected and/or disconnected for the predetermined second time period.

Such a controlling method, for example, is applied to four heaters 21a, 22a, 19b and 19c when the power consumption of each of the first, third, and fourth heaters 21a, 19b and 19c is about 250 watts, and the power consumption of the second heater 22a is 600 watts in connection with the heating temperature of the heat-supplied objects during printing.

First, the heat sources are divided into two groups so that the power consumptions of the two groups are about the same. Preferably, the second heater 22a of the above four heaters 21a, 22a, 19b and 19c, which requires largest power during printing is grouped into a first group, and the first, third, and fourth heaters 21a, 19b and 19c are grouped into a second group.

Figure 4:
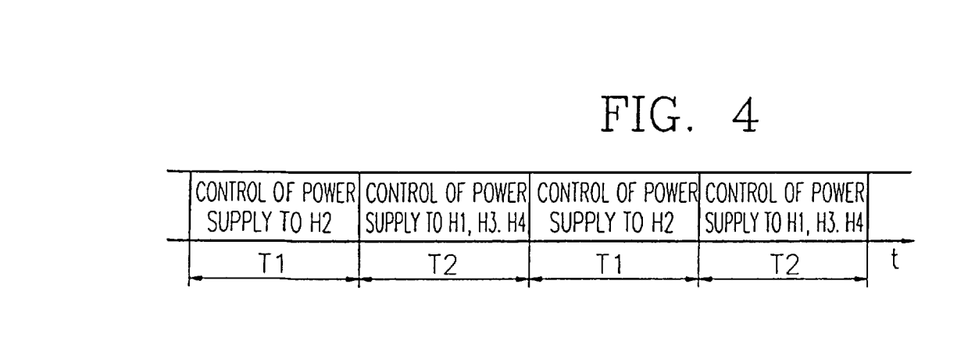
FIG. 4 is a timing diagram of a power supply controlling method according to a first embodiment of the present invention.

Once the groups are so divided, as shown in FIG. 4, the power supply controller 100 controls the power supply to the second heater 22a (H2) for a first time period TI depending on the temperature information transferred from the thermal sensor 92 so that the surface temperature of the fixing roller 22 is maintained within the range of preset target temperatures. That is, when the surface temperature of the fixing roller 22 falls below a preset lower limit temperature, the power supply controller 100 turns on the switch 82 so that power can be supplied to the second heater 22a (H2). When the surface temperature of the fixing roller 22 reaches a preset upper limit temperature within the first time period while the power supply to the second heater 22a (H2) is maintained, the power supply controller 100 turns off the switch 82 to disconnect the power supply to the second heater 22a (H2). Then, when the surface temperature of the fixing roller 22 reaches the preset lower limit temperature, the power supply controller 100 turns on the switch 82 again. Such a procedure is performed for the first time period T1. After the first time has passed, the switch 82 for the second heater 22a (H2) is turned off, the individual power supply controls to the first heater 21a (H1), third heater 19b (H3), and fourth heater 19c (H4) are independently performed for a second time period (T2) for the temperature control of the power supplied objects as for the previously described method of controlling temperature for the second heater 22a (H2). After the second time period has passed, the power supply to the second heater 22a (H2) is controlled again for the first time period as in the previously described method.

According to this example of such a controlling method, the maximum required power is reduced to 750 watts corresponding to a power supplied when the first heater 21a (H1), third heater 19b (H3), and fourth heater 19c (H4) all are supplied.

On the other hand, there is a method in which either group is given priority of the power supply control for controlling temperature, and the power supply to the other can be controlled when the power supply to the group having priority is disconnected.

Figure 5:
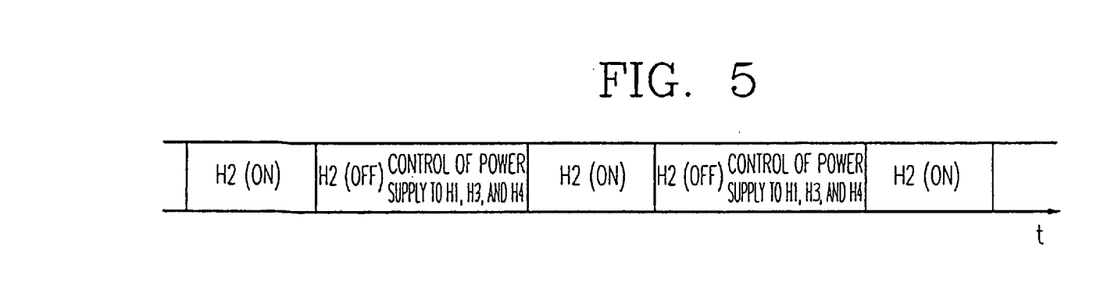
FIG. 5 is a timing diagram of a power supply controlling method according to a second embodiment of the present invention.

As shown in FIG. 5 as one example of the method, when the temperature of the heat-supplied object of the second heater, i.e., the surface temperature of the fixing roller 22, reaches a preset upper limit temperature, the power supply controller 100 turns off the switch 82 so that the power supply to the second heater 22a (H2) is disconnected, and when the surface temperature of the fixing roller 22 reaches a preset lower limit temperature, the power supply controller 100 turns on the switch 82 until the surface temperature of the fixing roller 22 reaches the preset upper limit temperature. While the power supply to the second heater 22a (H2) is controlled, the power supply to the first heater 21a (H1), third heater 19b (H3), and fourth heater 19c (H4) is controlled during a period when the power supply to the second heater 22a (H2) is disconnected, i.e., a period from a time when the surface temperature of the fixing roller 22 reaches the preset upper limit temperature to a time when the surface temperature of the fixing roller 22 falls to the preset lower limit temperature. The power supply to the first heater 21a (H1), third heater 19b (H3), and fourth heater 19c (H4) is connected or disconnected depending on the temperature information of the heat-supplied objects received from the individual thermal sensors 91, 93 and 94, so that the respective heat-supplied objects maintain their temperatures within the preset temperature range.

In another controlling method, when the maximum allowable power of the heat generating portion 60 is set to be 850 watts, the power supply to any one of the first heater 21a (H1), third heater 19b (H3), and fourth heater 19c (H4) may be controlled together with the power supply to the second heater 22a (H2). In this case, when there is a heater which requires a relatively fine temperature control among the first heater 21a (H1), third heater 19b (H3), and fourth heater 19c (H4), it is preferable that the heater can always be controlled, even when the power supply to the second heater 22a (H2) is also controlled.

Figure 6:
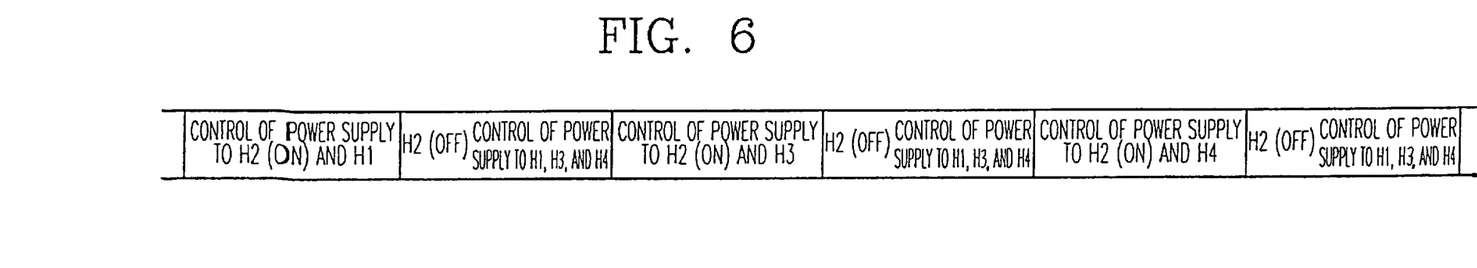
FIG. 6 is a timing diagram of a power supply controlling method according to a third embodiment of the present invention.

In a variation of the previous example, when the temperature control is similarly important for all of the first heater 21a (H1), third heater 19b (H3), and fourth heater 19c (H4), the power supply controller 100 controls the power supply to one heater so that the one heater is determined in turn according to a cycle of the first heater 21a (H1)_the third heater 19b (H3)_the fourth heater 19c (H4)_the first heater 21a (H1) whenever the period of the power supply to the second heater 22a (H2) is as shown in the FIG. 6 timing diagram.

In still another method, after the second heater 22a is grouped into a first group and the first heater 21a, third heater 19b, and fourth heater 19c are grouped into a second group, priority of the power supply control is given to the second group, and the power supply to the second heater 22a is disconnected without reference to the temperature control requirement of the second heater 22a when power is supplied to at least two heaters of the second group. A corresponding circuit diagram is shown in FIG. 7.

Figure 7:
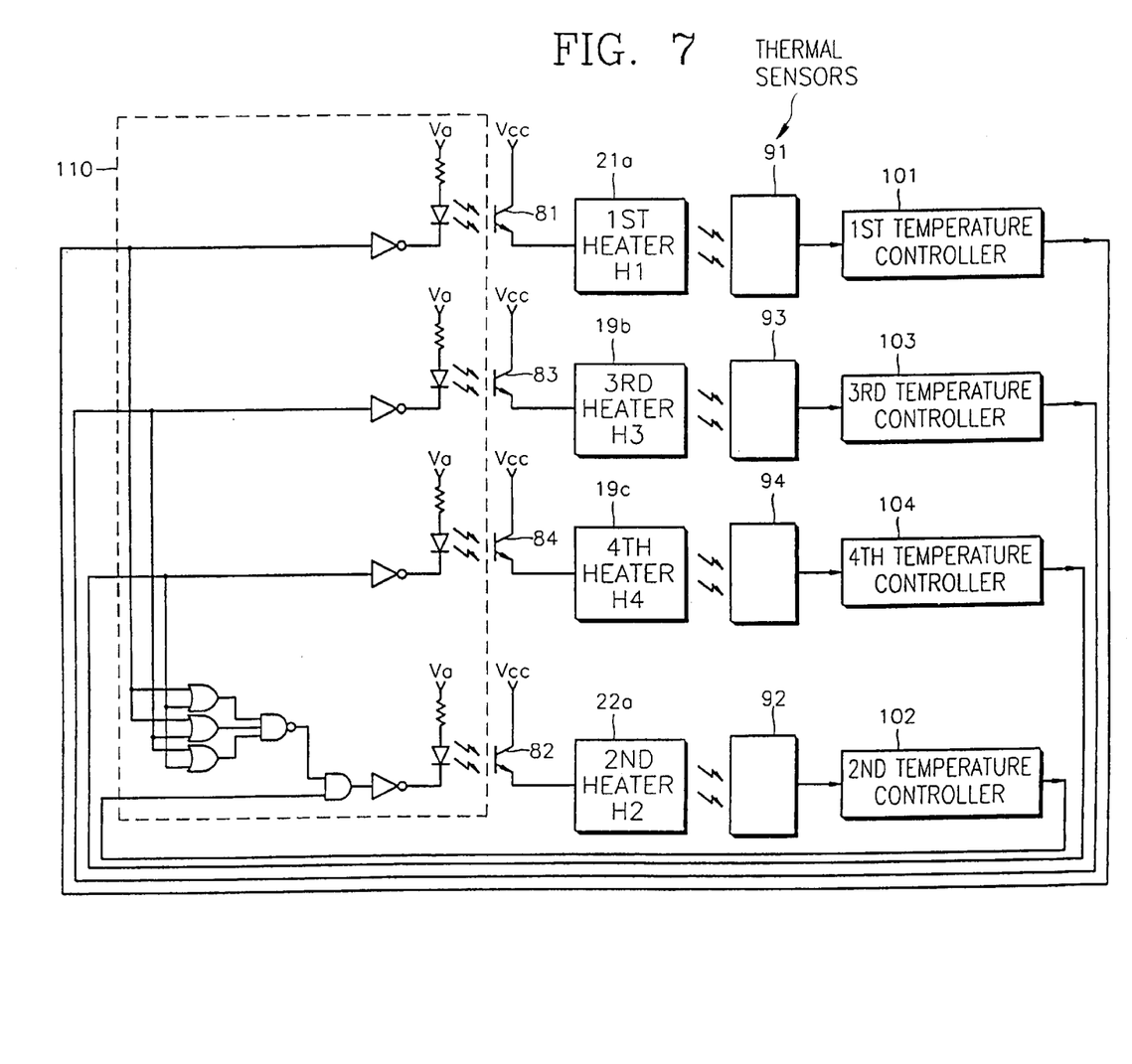
FIG. 7 is a circuit diagram illustrating an example of a power supply controller of the power supply controlling apparatus of FIG. 3.

Referring to FIG. 7, a power supply controller 100 has four temperature controllers 101, 102, 103 and 104 which generate signals requesting connection or disconnection of power supply to the individual heaters 21a, 22a, 19b and 19c depending on the signals output from the thermal sensors 91, 92, 93 and 94, installed correspondingly to the respective heaters 21a, 22a, 19b and 19c. A signal adjusting portion 110 adjusts the signals requesting connection or disconnection of power to the individual heater 21a, 22a, 19b and 19c, the signals output from the individual temperature controllers 101, 102, 103 and 104.

Switches 81, 82, 83 and 84, employing phototransistors which are turned on by receiving respective light signals, are installed in respective power lines which connect the power source VCC of the power supply unit 70 with the individual heaters 21a, 22a, 19b and 19c, respectively.

The first heater 21a is intended to heat the transfer roller 21, the second heater 22a is intended to heat the fixing roller 22, and the third and fourth heaters 19b and 19c are intended to heat the drying unit 18.

When the individual surface temperatures of the heat-supplied objects, measured by the thermal sensors 91, 92, 93 and 94 paired with the respective temperature controllers 101, 102, 103 and 104, reach preset upper limit temperatures, the individual temperature controllers 101, 102, 103 and 104 output first signals requesting disconnection of the power supply from the corresponding heaters 21a, 22a, 19b and 19c, and when the individual surface temperatures of the heat-supplied objects reach preset lower limit temperatures, the individual temperature controllers 101, 102, 103 and 104 output second signals, requesting connection of the power supply to the corresponding heaters 21a, 22a, 19b and 19c, via output channels provided corresponding to the heaters 21a, 22a, 19b and 19c. In the illustrated example, low level signals are the first signals and high level signals are the second signals.

The three output channels corresponding to the first heater 21a (H1), third heater 19b (H3), and fourth heater 19c (H4) of the four output channels of the signal adjusting portion 110, are adapted to output optical signals to the corresponding switches 81, 83, and 84. The light emission of the switches is turned on/off according to the output signals from the temperature controllers 101, 103 and 104 corresponding with the channels.

The output value of the output channel of the signal adjusting portion 110 corresponding to the second heater 22a is decided according to a logic operation result using output values of the temperature controllers 101, 103 and 104 corresponding to the first, third, and fourth heaters 21a, 19b and 19c. That is, when at least two second signals (a high signal whose logic value is 1) are included among the output values of the temperature controllers 101, 103 and 104 corresponding to the first, third, and fourth heaters 21a, 19b and 19c, the signal adjusting portion 110 outputs a signal which turns off the switch 82 so the power supply to the second heater 22a is disconnected without reference to the output value from the second temperature controller 102.

To the contrary, when only one second signal is included among the output values of the temperature controllers 101, 103 and 104 corresponding to the first, third, and fourth heaters 21a, 19b and 19c, or when all the output values are first signals (low), the operation of the switch 82 is controlled so that the power supply to the second heater is connected or disconnected according to the output value from the second temperature controller 102.

According to such a power supply control method, even when the second temperature controller 102 requests the power supply to the second heater 22a so that the preset temperature of the second heater 22a can be maintained, the power supply to the second heater 22a is intentionally delayed while the power supply control for at least two heaters of the heaters 21a, 19b and 19c, belonging to the second group, is performed. Then, when the power supply control, for one or for none of the heaters 21a, 19b and 19c belonging to the second group, is performed, the power supply begins responding to the request for power to the second heater 22a. Therefore, even though the temperature control range of the fixing roller 22 may be extended more or less, the maximum instantaneous consumed power is always smaller than the power supplied to all the heaters.

The circuit shown in FIG. 7 may be configured differently so that a signal which turns off the switch 82 can be output from the signal adjusting portion 110, in order to disconnect the power supply to the second heater 22a without reference to the output value from the second temperature controller 102, only when all the output values of the temperature controllers 101, 103 and 104 corresponding to the first, third, and fourth heaters 21a, 19b and 19c are the second signals (a high signal whose logic value is 1). In this case, when all the output values of the temperature controllers 101, 103 and 104 corresponding to the first, third, and fourth heaters 21a, 19b and 19c are not the second signals (a high signal whose logic value is 1), the operation of the switch 82 is controlled so that the power supply control for the second heater 22a is performed according to the output value from the second temperature controller 102.

As described above, according to the present method of controlling the power supply for heat sources of a printer and the apparatus therefor, the maximum consumed power of employed heaters can be reduced. Therefore, the required power capacity of the power supply unit and the amount of current of the power supply lines can be lowered.

What is claimed is:

1. A method of controlling a power supply from a power supply unit to heat sources of a printer that comprises a heat generating portion having at least three heat sources, the power supply unit, and a power supply controller for controlling the power supply from the power supply unit to the heat generating portion, including the steps of:

a) grouping predetermined ones of the heat sources into a first group, and grouping all or part of the remaining ones of the heat sources not belonging to the first group into a second group for adjusting periods of power supply to the heat sources belonging to the heat generating portion;

b) controlling, for a predetermined first time period, the power supply to the heat sources belonging to the first group for controlling temperatures of the heat sources belonging to the first group, while disconnecting the power to the heat sources belonging to the second group during the predetermined first time period;

c) disconnecting, for a predetermined second time period after the first time period has passed, the power supply to the heat sources belonging to the first group, while controlling the power supply to the heat sources belonging to the second group for controlling temperatures of the heat sources belonging to the second group for the predetermined second time period; and d) repeating step b) and step c) at least once.

2. A method as claimed in claim 1, wherein the heat generating portion comprises a first heat source for heating a transfer roller which transfers a toner image formed on a photosensitive medium to a paper, a second heat source for heating a fixing roller which rotates while pressing against the transfer roller so that the toner image transferred to the transfer roller can be securely fixed to the paper, and third and fourth heat sources installed in a drying unit, the drying unit for absorbing and evaporating liquid carrier remaining on the photosensitive medium, and wherein the second heat source, which requires the largest power among the four heat sources during printing, is grouped into the first group, and wherein the first, third, and fourth heat sources are grouped into the second group.

3. A method of controlling a power supply from a power supply unit to heat sources of a printer that comprises a heat generating portion having a first heat source for heating a transfer roller which transfers a toner image formed on a photosensitive medium to a paper, a second heat source for heating a fixing roller which rotates while pressing against the transfer roller so that the toner image transferred to the transfer roller can be securely fixed, third and fourth heat sources installed in a drying unit that absorbs and evaporates liquid carrier remaining on the photosensitive medium, and a power supply controller for controlling the power supply from the power supply unit to the heat generating portion, including the steps of:

a) supplying power to the second heat source until the surface temperature of the fixing roller reaches a preset upper limit temperature;

b) disconnecting the power supply to the second heat source when the surface temperature of the fixing roller reaches the upper limit temperature, and then individually controlling the power supply to the first, third, and fourth heat sources until the surface temperature of the fixing roller falls to a lower limit temperature set below the upper limit temperature, the controlling for maintaining preset target temperatures of the heat-supplied objects corresponding to the first, third, and fourth heat sources; and c) repeating the step a) and step b) at least once.

4. A method as claimed in claim 3, wherein while the step a) is performed, the power supply to any one heat source selected from the first, third, and fourth heat sources is controlled together with the second heat source for controlling the temperature thereof.

5. A method as claimed in claim 4, wherein whenever the step a) is performed, one heat source is selected in turn from the first, third, and fourth heat sources and the power supply to the selected heat source is controlled for maintaining a preset target temperature of the selected heat source.

6. An apparatus for controlling a power supply from a power supply unit, comprising:

a heat generating portion having a plurality of heat sources;

a switching portion having a plurality of switches that individually connect or disconnect the power supply from the power supply unit to the plurality of heat sources;

thermal sensors for sensing respective temperatures of heat-supplied objects corresponding to the heat sources and generating corresponding temperature signals; and a power supply controller for inputting the temperature signals from the thermal sensors and, based on the sensed temperatures, controlling the switching portion by adjusting the on times of the power supply to respective heat sources so that all periods of power supply to the heat sources do not overlap, and so that the temperatures of the heat-supplied objects are maintained within respective preset temperature ranges having upper and lower limits.

7. An apparatus as claimed in claim 6, wherein the power supply controller comprises:

temperature controllers which output first signals when corresponding ones of the temperature signals indicate that surface temperatures of the heat-supplied objects have reached respective preset upper limit temperatures, and which output second signals when corresponding ones of the temperature signals indicate that surface temperatures of the heat-supplied objects have reached respective preset lower limit temperatures, the first signals indicative of a request for disconnection of power supply to a respective one of the plurality of heat sources, the second signals indicative of a request for connection of power supply to a respective one of the heat sources, the first and second signals being output via output channels provided corresponding to the respective heat sources; and a signal adjusting portion for receiving the first or second signals output via the output channels of the temperature controllers, and, when all the received signals are the second signals, converting some of the second signals into the first signals according to an internally determined signal conversion method, the signal adjusting portion outputting both the adjusted signals and non-adjusted signals to the switching portion.

8. An apparatus as claimed in claim 7, wherein the signal adjusting portion groups predetermined ones of the plurality of heat sources into a first group, and groups all or part of the remaining heat sources not belonging to the first group into a second group for adjusting periods of power supply to the plurality of heat sources;

and wherein the signal adjusting portion outputs the first or second signals received from the temperature controllers in connection with the heat sources belonging to the second group to the switching portion, these second group signals output as they are;

and wherein when the temperature controllers generate the second signals with respect to at least two heat sources of the heat sources belonging to the second group, the signal adjusting portion outputs the first signals to the switching portion corresponding to the temperature controllers for the heat sources belonging to the first group, without reference to the signals received from the temperature controllers in connection with the first group, which causes the switches corresponding to the first group to be turned off;

and wherein when the temperature controllers generate the second signals with respect to one or none of the heat sources belonging to the second group, the signal adjusting portion outputs signals received from the temperature controllers in connection with the first group, these first group signals output as they are.

9. An apparatus as claimed in claim 8, wherein a second heat source belongs to the first group, the second heat source for heating a fixing roller which rotates while pressing against a transfer roller that transfers a toner image formed on a photosensitive medium to a paper and securely fixes the toner image transferred to the paper, and wherein a first, third, and fourth heat source belong to the second group, the first heat source for heating the transfer roller, and the third and fourth heat sources installed in a drying unit that absorbs and evaporates liquid carrier remaining on the photosensitive medium.

10. An apparatus as claimed in claim 7, wherein the signal adjusting portion groups predetermined ones of the plurality of heat sources into a first group, and groups all or part of remaining heat sources not belonging to the first group into a second group for adjusting periods of power supply to the plurality of heat sources belonging to the heat generating portion, and wherein the signal adjusting portion outputs signals received from the temperature controllers in connection with the heat sources belonging to the second group to the switching portion, these second group signals output as they are, and wherein when the temperature controllers generate the second signals with respect to all the heat sources belonging to the second group, the signal adjusting portion outputs the first signals to the switching portion corresponding to the temperature controllers for the heat sources belonging to the first group, without reference to the signals received from the temperature controllers in connection with the first group, which causes all the switches corresponding to the first group to be turned off, and wherein when the temperature controllers generate the first signal with respect to at least one heat source of the heat sources belonging to the second group, the signal adjusting portion outputs signals received from the temperature controllers in connection with the first group, these first group signals output as they are.

11. An apparatus as claimed in claim 10, wherein a second heat source belongs to the first group, the second heat source for heating a fixing roller which rotates while pressing against a transfer roller which transfers a toner image formed on a photosensitive medium to a paper and securely fixes the toner image transferred to the paper, and wherein a first, third, and fourth heat source belong to the second group, the first heat sources for heating the transfer roller, and the third and fourth heat sources installed in a drying unit that absorbs and evaporates carrier liquid remaining on the photosensitive medium belong to the second group.

* * * * *